(12) United States Patent
Grabow et al.

(10) Patent No.: US 12,454,357 B2
(45) Date of Patent: Oct. 28, 2025

(54) FREIGHT CARRIER FOR BEING RECEIVED IN THE FREIGHT REGION OF AN AIRCRAFT HAVING DISPLACEABLE ROLLER ELEMENTS

(71) Applicant: Airbus Operations GmbH, Hamburg (DE)

(72) Inventors: Thomas Grabow, Hamburg (DE); Dirk Meiranke, Hamburg (DE); Andreas Poppe, Hamburg (DE); Hermann Benthien, Hamburg (DE); Ralf Schliwa, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 992 days.

(21) Appl. No.: 17/548,223

(22) Filed: Dec. 10, 2021

(65) Prior Publication Data

US 2022/0194585 A1     Jun. 23, 2022

(30) Foreign Application Priority Data

Dec. 17, 2020   (DE) ................ 10 2020 133 943.7

(51) Int. Cl.
*B64D 9/00*     (2006.01)
(52) U.S. Cl.
CPC ........ *B64D 9/003* (2013.01); *B64D 2009/006* (2013.01)
(58) Field of Classification Search
CPC .. B60P 1/52; B64D 9/00; B64D 9/003; B64D 2009/006

(Continued)

(56) References Cited

U.S. PATENT DOCUMENTS

| | | | |
|---|---|---|---|
| 1,892,406 A | | 12/1932 | Rudolph et al. |
| 2,572,348 A | * | 10/1951 | Johnson ................ B65D 19/42 16/19 |
| 2,663,048 A | | 12/1953 | Ross et al. |
| 4,213,624 A | * | 7/1980 | Sanders ................ B65D 19/42 280/43.12 |

(Continued)

FOREIGN PATENT DOCUMENTS

| | | |
|---|---|---|
| DE | 9112675 U1 | 12/1991 |
| DE | 10 2008 038637 A1 | 2/2012 |

(Continued)

OTHER PUBLICATIONS

European Search Report for Application No. 21214395 dated Apr. 5, 2022.

(Continued)

*Primary Examiner* — Stephen T Gordon
(74) *Attorney, Agent, or Firm* — KDW Firm PLLC

(57) ABSTRACT

A freight carrier for a freight region of an aircraft, having a base element with a support side and roller elements. Each of the roller elements is retained on a retention member to be rotatable about a rotation axis, wherein each of the retention members is displaceable between a deployed position and a retracted position, wherein the spacing of the roller elements from the base face is greater in the deployed position. The rotation axes of the roller elements are in a common rotation axis plane when the retention members are in the deployed position, the roller elements retained on the base element so the rotation axis of each of the roller elements is rotatable about a vertical axis, wherein the vertical axis extends parallel with and with spacing from an axis which extends through the rotation axis of the roller element and perpendicularly to the rotation axis plane.

17 Claims, 9 Drawing Sheets

(58) Field of Classification Search
USPC .......... 410/7, 66, 67, 69, 84, 91; 16/33, 34; 248/430
See application file for complete search history.

(56) References Cited

U.S. PATENT DOCUMENTS

| | | |
|---|---|---|
| 4,417,738 A | 11/1983 | Kendall |
| 4,929,133 A * | 5/1990 | Wiseman .................. B64C 1/20 |
| | | 410/67 |
| 2003/0223838 A1 | 12/2003 | Looker |
| 2006/0039771 A1* | 2/2006 | Zhou .................. B65D 19/0034 |
| | | 410/84 |
| 2021/0206566 A1 | 7/2021 | Araki et al. |

FOREIGN PATENT DOCUMENTS

| | | |
|---|---|---|
| EP | 2 492 217 A1 | 8/2012 |
| EP | 3 006 329 B1 | 12/2018 |
| EP | 3 006 341 B1 | 12/2018 |
| GB | 624 303 A | 6/1946 |
| JP | 2007112474 A | 5/2007 |
| JP | 2011116451 A | 6/2011 |
| WO | WO 2019/229844 A1 | 12/2019 |

OTHER PUBLICATIONS

German Search Report for Application No. 10202013943 dated Dec. 7, 2021.

* cited by examiner

FREIGHT CARRIER FOR BEING RECEIVED IN THE FREIGHT REGION OF AN AIRCRAFT HAVING DISPLACEABLE ROLLER ELEMENTS

CROSS-REFERENCE TO RELATED APPLICATION

This application claims priority to German Patent Application No. 10 2020 133 943.7 filed Dec. 18, 2020, the entire disclosure of which is incorporated by reference herein.

TECHNICAL FIELD

The disclosure herein relates to a freight carrier for being received in the freight region of an aircraft.

BACKGROUND

From the prior art, it is known that the freight region of an aircraft is loaded in such a manner that individual freight elements or freight carriers or so-called freight containers of dimensionally stable material, such as aluminium, are received and these freight containers are then conveyed into the freight region. To this end, on the one hand, a first conveying device is required, by which the freight containers are conveyed, for example, from the taxiway to the entrance to the freight region. On the other hand, it is known to provide within the freight region a second conveying device, such as, for example, a conveyor belt arrangement or a roller system, by which the freight containers can be conveyed within the freight region on the base face thereof from the entrance to the final position.

Both the freight containers themselves and the conveyor device within the freight region may have a not inconsiderable weight, it being desirable to keep the weight of an aircraft as low as possible, however, in order to minimise the fuel consumption thereof.

Furthermore, it is also desirable for the freight carriers or freight containers not only to be able to be received in the freight region of an aircraft which is specifically configured for this purpose, but also the freight carriers should, when the passenger cabin is not used at all or only partially used, be able to be deposited therein when the passenger seats have been removed from the cabin. In such a case, it is particularly desirable for the freight containers or freight carriers to be able to be displaced in a simple manner by the loading operators inside the passenger cabin and consequently moved to their final position.

From DE 10 2008 038 637 A1 it is known to provide a freight container in the region of the base thereof with wheels which can be moved back and forth between a retracted and a deployed position using an activation device. EP 3 006 329 B1 and EP 3 006 341 B1 each describe that, on the base face of the freight region of an aircraft, there are fitted in a displaceable manner carrier elements which have a fan unit by which they can be raised with respect to the base face. Freight containers which are arranged on rails which are also provided on the base face can be lifted initially by carrier elements after they have been pushed under the containers. The containers can then be displaced by the carrier elements. In order to deposit the containers, the fan unit of the carrier elements is then deactivated again and the carrier elements can be pulled out under the displaced container since it is then positioned on the rails again.

Furthermore, in this context, it is known from EP 2 492 217 A1 to use as freight containers a container which is made of textile material and which has planar reinforcement elements. The disadvantage of such a container is that it can itself be moved only with difficulty over a planar base face of a freight region so that at this location conveyor devices which themselves are linked with a considerable weight are still required.

Furthermore, freight carriers with freight products from vehicles or semi-trailers which can be moved over the taxiway have to be conveyed into the freight region of an aircraft, wherein, for this purpose, conveyor belts which extend in an inclined manner between a loading position close to the taxiway and the loading hatch are generally used. In this instance, there is the problem that the freight carrier has to be moved in an inclined manner with respect to the plane of the floor of the freight region through the loading hatch, wherein the cross section of the loaded freight carrier, when it is moved in an inclined manner to the loading hatch, is too large to be able to pass the loading hatch.

Another problem which arises as a result of the inclination of the conveyor belt between the taxiway and loading hatch of the freight region is that the base face of the freight carrier on which the freight is positioned is inclined during transport by the conveyor belt, which can lead to the freight sliding on the base face.

SUMMARY

Based on the prior art, therefore, the object of the disclosure herein is to overcome the above-mentioned problems and in particular to configure the components which are used to load the freight region of an aircraft and which remain in the aircraft during the flight to be as lightweight as possible and nonetheless enable a comfortable loading. Furthermore, there is intended to be provided a freight carrier which can be used in a flexible manner and which is not dependent on a conveyor system in a freight region but can instead be readily maneuvered even without such conveyor systems.

According to the disclosure herein, this object is achieved with a freight carrier for being received in the freight region of an aircraft, having a base element which has a support side which is arranged on the freight carrier in such a manner that the freight carrier can be positioned on a base face of a freight region of an aircraft so that the support surface is opposite the base face, wherein the freight carrier is configured to be moved over the base face which extends in a base plane in such a manner that the support face faces the base face, wherein the base element has a base face which is arranged at the side of the base element which faces away from the support side, wherein the support side is provided with a large number of roller elements, wherein each of the roller elements is retained on a retention member so as to be able to be rotated about a rotation axis, wherein each of the retention members can be displaced between a deployed position and a retracted position, wherein the spacing of the roller elements from the base face is greater in the deployed position than in the retracted position, wherein the rotation axes of the roller elements are arranged in a common rotation axis plane when the retention members are in the deployed position and wherein the roller elements are retained on the base element in such a manner that the rotation axis of each of the roller elements can be rotated about a vertical axis, wherein the vertical axis extends parallel with and with spacing from an axis which extends through the rotation axis of the roller element and perpendicularly to the rotation axis plane.

Accordingly, the disclosure herein provides a freight carrier which can be received in a freight region of an aircraft, wherein the term "freight region" includes both the actual freight space and a cabin region of the aircraft which is configured in such a manner that, for example, by removing the passenger seats, freight can also be received at that location.

According to the disclosure herein, a freight carrier according to the disclosure herein for being received in the freight region first has a base element which has a support side. This support side is the side of the base element which, during normal use of the freight carrier, faces the base face of the freight region. Consequently, it is arranged in such a manner that during normal use it is opposite the base face of the freight region. Furthermore, the base element of the freight carrier has another base face which is provided at the side of the base element opposite the support side and at which freight elements, such as luggage but also any other type of objects, can be arranged. Furthermore, there may also be provided on the base element a circumferential wall which extends away from the base face and which surrounds a receiving space of the freight carrier for the freight elements. Such a construction is also included by the subject-matter of the disclosure herein.

In order to enable the freight carrier to be able to be moved over the base face of a freight region, there are provided at the support side of the base element a large number of roller elements, wherein each of the roller elements is fitted to a retention member and can be rotated relative thereto about a rotation axis which preferably extends horizontally and consequently parallel with a plane in which the base element also extends. Each of the retention members can be displaced with respect to the base element between a deployed position and a retracted position so that the spacing of the rotation axis and consequently of the roller element from the base face changes. In the deployed position, the spacing is greater than in the retracted position so that the roller element in the deployed position is positioned on a base face of the freight region and the base element of the freight carrier can be readily moved over it. In this instance, when all the retention members are in the deployed position, the rotation axes of the roller elements are arranged in a common rotation axis plane. When the retention members are in the retracted position, however, the roller elements are located in a position in which they are preferably moved back behind support elements which are arranged in a support plane on the base element so that the support elements are positioned on the base face and the freight carrier can no longer be readily displaced.

Finally, the roller elements are fitted to the retention member and the base element in such a manner that for each roller element whose rotation axis can be rotated about a vertical axis which extends, on the one hand, perpendicularly to the rotation axis of the roller element and which, on the other hand, is parallel and spaced apart from an axis which extends perpendicularly to the rotation axis plane and through the rotation axis of the roller element. Accordingly, the rotation axes about which the roller elements can be rotated in each case are arranged eccentrically with respect to the vertical axis. In order to achieve this, it is, on the one hand, possible for the retention member to be fitted to the base element so as to be able to be rotated about the vertical axis. On the other hand, it is also possible for the roller elements to be fitted within the retention members so as to be able to be rotated relative thereto about the vertical axis.

It is thereby possible for the roller elements, when the freight carrier is pushed in a predetermined direction, as a result of this eccentric arrangement, to be aligned in such a manner that the rotation axis extends perpendicularly to the direction in which the freight carrier is moved. The eccentric arrangement of the vertical axis relative to the rotation axis of the roller elements thus leads to the roller elements being independently orientated and a freight carrier, even when it is heavily loaded, generally being able to be pushed by one person over the base face of the freight region of an aircraft when the retention members of the roller elements are all in the deployed position.

Therefore, it is possible with the structure of the freight carrier according to the disclosure herein for it to be able to be maneuvered without difficulty over a base face of a freight region without additional devices being required for this purpose in the freight region. Instead, this can be carried out by a single person. As a result of the adjustability of the retention members of the roller elements, it is further possible for the freight carrier when it has reached its end position to be able to additionally be lowered on the base face and to be prevented from independent movement over the base face.

In a preferred embodiment, the roller elements can be displaced along the vertical axes thereof between the retracted position and deployed position, that is to say, actually in the direction which extends perpendicularly to the rotation axis plane. However, it is also conceivable for the travel direction to extend in an inclined manner relative to the rotation axis plane.

In another preferred embodiment, the support side has support elements which are arranged in a support plane, wherein the roller elements protrude in the deployed position of the retention members over the support plane and in the retracted position are moved back behind them. In this instance, the support elements may act as support locations in which the freight carrier is positioned on the base face when the roller elements are displaced into the retracted position. In particular, it is conceivable for the support elements to be spaced apart in such a manner that they can be arranged on the rails in the floor of the passenger cabin of an aircraft in which the passenger seats are normally retained. In this manner, it may be possible for the freight carrier according to the disclosure herein to be able to be arranged not only in the freight region, but also in regions of the passenger cabin in which the seats have previously been removed in order to also use the passenger cabin as a freight region.

It is further preferable for there to be provided on the base element locking pins which extend perpendicularly to the support plane and which are retained on the base element so as to be able to be displaced perpendicularly to the support plane so that the locking pins can be displaced between a release position and a locking position, wherein in the locking position thereof a free end of the locking pins protrudes over the support plane and in the release position thereof the free end of the locking pins is arranged in the support plane or at the side of the support plane facing away from the rotation axis plane.

Using the locking pins, it is possible to lock the freight carrier in recesses which are provided for this purpose in the base face of the freight region when it has assumed its intended position. In a further preferred manner, the position of the locking pins on the base element can be adjusted in a manner parallel with the support plane. It is thereby possible to adapt the freight carrier to differently arranged holes or recesses in the base face of the freight region.

In another preferred embodiment, the large number of roller elements may comprise a plurality of groups of roller elements, wherein the retention members, in which the roller elements of a first of the groups are retained, are retained so as to be able to be displaced along a linearly extending first line on the base element between the retracted and the deployed position, wherein the first line extends parallel with the rotation axis plane. In such an arrangement, the roller elements are arranged along a first line and can further be displaced perpendicularly to this line with respect to the base element.

It is further possible for each of the retention members, in which the roller elements of the first groups are retained, to have an engagement face which extends in an inclined manner at an angle of less than 90° with respect to the vertical axis about which the roller element which is retained in the retention member can be rotated. Furthermore, there is provided an actuation rod which extends along the first line and which has counter-faces which are opposite the engagement faces which extend in an inclined manner and which are in planar abutment with the engagement faces, wherein the actuation rod is retained so as to be able to be displaced along the first line in the base element so that the actuation rod can be displaced between an inserted and a deployed position. A displacement of the actuation rod from the inserted into the deployed position brings about a displacement of the retention members, in which the roller elements of the first group are retained, from the retracted into the deployed position.

In this structure, the retention members, in which the roller elements of the first group are received and which are arranged along the first line, have inclined engagement faces against which counter-faces which are also inclined on the actuation rod abut, preferably over the entire face. The latter in turn extends parallel with the first line. When the actuation rod is displaced along the first line, the retention members are pushed out of the base element or it is made possible for them to move into the base element. In this manner, the retracted or the deployed position can be produced, wherein a comparatively simple structure is provided for this purpose. As a result of the preferred full-surface abutment of counter-faces and engagement faces, it may be additionally possible for this structure to have a high degree of stability.

For simple movement of the actuation rod, it is further preferable for an actuation arm which is pivotably retained on the base element to be provided, wherein the actuation rod is articulated to the actuation arm and a pivoting of the actuation arm with respect to the base element brings about a displacement of the actuation rod along the first line.

In another preferred embodiment, a first end of the actuation rod in the inserted position may protrude over an edge of the base element to a first extent, wherein the first end of the actuation rod is retracted inside the base element or the first end protrudes to a second extent which is smaller than the first extent when the actuation rod is in the deployed position. Using the first end of the actuation rod, the freight carrier can be secured to elements of the freight region against a vertical movement when it is in the end position thereof, in which the actuation rod is in the retracted position and consequently the roller elements are in the retracted position and a movement of the freight carrier is certainly not intended to occur.

In a further preferred manner, the base element has in a surface opposite the first end of the actuation rod a receiving recess which is adapted to receive the first end of an actuation rod. The first end of the actuation rod of a first freight carrier, which end protrudes in the retracted position, can then be received in the receiving recess of another freight carrier, which has been deposited directly adjacent to the first freight carrier in the freight region in order to lock both freight carriers with respect to each other. In this manner, it is possible to couple a large number of freight carriers securely to each other in order to prevent a movement of the freight carriers in particular in a vertical direction when impacts occur in the aircraft in a vertical direction.

If the large number of roller elements comprises a plurality of groups of roller elements and the retention members, in which the roller elements of a first of the groups are retained, are retained so as to be able to be displaced along a linearly extending first line on the base element between the retracted and the deployed position, it is preferable for a cam rod which extends along the first line to be provided. In this instance, the cam rod may have cam elements which are connected thereto in a rotationally secure manner, wherein the cam rod can be rotated about an axis which extends parallel with the rotation axis plane and the first line, wherein a cam element is associated with each of the retention members, in which the roller elements from the first group are retained, wherein each of the retention members in which the roller elements from the first group are retained, has an abutment face which comprises at least one base portion, wherein the base portion, when viewed in a direction perpendicular to the rotation axis plane, is arranged between the cam rod and the rotation axis plane and wherein the cam element abuts the base portion of the abutment face of the retention member which is associated with the cam element.

Rotating the cam rod causes the cam elements which are provided thereon, the retention members in which the roller elements of the first group are received, as a result of the abutment of the cam elements against the base portion of the abutment face to be moved between the retracted and the deployed position. This represents a further simple possibility of bringing about the displacement of the retention members between the retracted and the deployed position. In this instance, it is also possible for the abutment faces to completely surround the cam elements in order to ensure the greatest possible contact between the cam elements and the retention members.

In particular, in a further preferred manner, each of the retention members, in which the roller elements from the first group are retained, has a circular hole whose inner face forms the abutment face and through which the cam rod extends, wherein the cam elements have a circular cross section and abut the abutment face over the entire extent thereof. Particularly in this instance, such a full-face contact is ensured so that the entire arrangement comprising the cam rod, cam elements and retention members is particularly stable.

If the large number of roller elements comprises a plurality of groups of roller elements and the retention members, in which the roller elements of a first of the groups are retained, are retained so as to be able to be displaced along a linearly extending first line on the base element between the retracted and the deployed position, in another preferred embodiment on the base element a first lever rod can be pivotably retained. The first lever rod may extend parallel with the first line, wherein on the first lever rod a large number of lever elements are secured so as to be non-rotatable, wherein a lever element is associated with each of the retention members, in which the roller elements from the first group are retained, wherein the retention members in which the roller elements from the first group are retained have guide rails which are configured to receive a free end of the lever element which is associated with the retention member in such a manner that it can be displaced in a direction transverse, preferably perpendicular, to the vertical axis, about which the retention member which is associated with the lever element can be rotated, and cannot be displaced parallel with this vertical axis, wherein the guide rails extend perpendicularly to an extent direction of the first lever rod and wherein a lever arm is coupled to the first lever rod.

In this arrangement, a pivoting of the lever elements by pivoting the lever rod by the lever arm initially brings about a movement in a direction transverse relative to the vertical axis about which the roller element which is supported in this retention member can be rotated. This movement in turn also brings about a change of the vertical position of the first end of the lever elements. This leads to the retention members, in whose guide rails the first ends of the lever elements are received, being displaced in a vertical direction. Consequently, this structure represents another simple possibility of bringing about the displacement of the retention members between the retracted and the deployed position.

It is further possible for the retention members, in which the roller elements of a second of the groups are retained, to be retained so as to be able to be displaced along a linearly extending second line on the base element between the retracted position and the deployed position, wherein the second line extends parallel with the first line, wherein there is pivotably retained on the base element a second lever rod which extends parallel with the second line, wherein a large number of second lever elements are secured to the second lever rod in a non-rotatable manner, wherein a second lever element is associated with each of the retention members, in which the roller elements from the second group are retained, wherein the retention members, in which the roller elements from the second group are retained, have second guide rails which are configured to receive a free end of the second lever element which is associated with the retention member in such a manner that it can be displaced in a direction transverse, preferably perpendicular, to the vertical axis about which the retention member which is associated with the second lever element can be rotated and cannot be displaced parallel with this vertical axis, wherein the second guide rails extend perpendicularly to an extent direction of the second lever rod and wherein the second lever rod is coupled to the first lever rod in such a manner that a pivot movement of the lever arm leads to a pivot movement of the second lever rod.

In this structure, the retention members which receive the roller elements of the first group and the retention members which receive the roller elements of the second group are moved as a result of the movement of a single lever arm. This is because the lever arm which is coupled to the first lever rod is also coupled to the second lever rod so that when the lever arm is pivoted both lever rods are pivoted and the retention members are thus moved by roller elements which are arranged parallel with each other along the first line and second line at the same time between the retracted and the deployed position. This principle can also be extended to other groups of roller elements.

If, finally, the large number of roller elements comprises a plurality of groups of roller elements and the retention members, in which the roller elements of a first of the groups are retained, are retained so as to be able to be displaced along a linearly extending first line on the base element between the retracted and the deployed position, the base element may in another preferred embodiment have an upper and a lower covering plate. A first and a second profile element are then provided and extend parallel with each other and the first line between the upper and the lower covering plate, wherein the retention members, in which the roller elements from the first group are retained, abut the first and the second profile element so that they are guided thereby in a direction perpendicular to the rotation axis plane, and wherein there are provided on the upper and/or the lower covering plate angular guiding members having guiding faces which extend in a transverse direction relative to the first line and which the retention members in which the roller elements from the first group are retained abut.

In this structure, it is possible for the base element to be constructed in a modular manner and therefore to be able to be produced in a cost-effective manner. At the same time, a guiding of the retention members in the base element is simply brought about, by which guiding the retention members can carry out a movement perpendicular to the rotation axis plane relative to the base element, but at the same time are prevented from carrying out a movement parallel with this plane.

BRIEF DESCRIPTION OF THE DRAWINGS

The disclosure herein is explained below with reference to drawings which show preferred embodiments, wherein.

DETAILED DESCRIPTION

Figure 1:
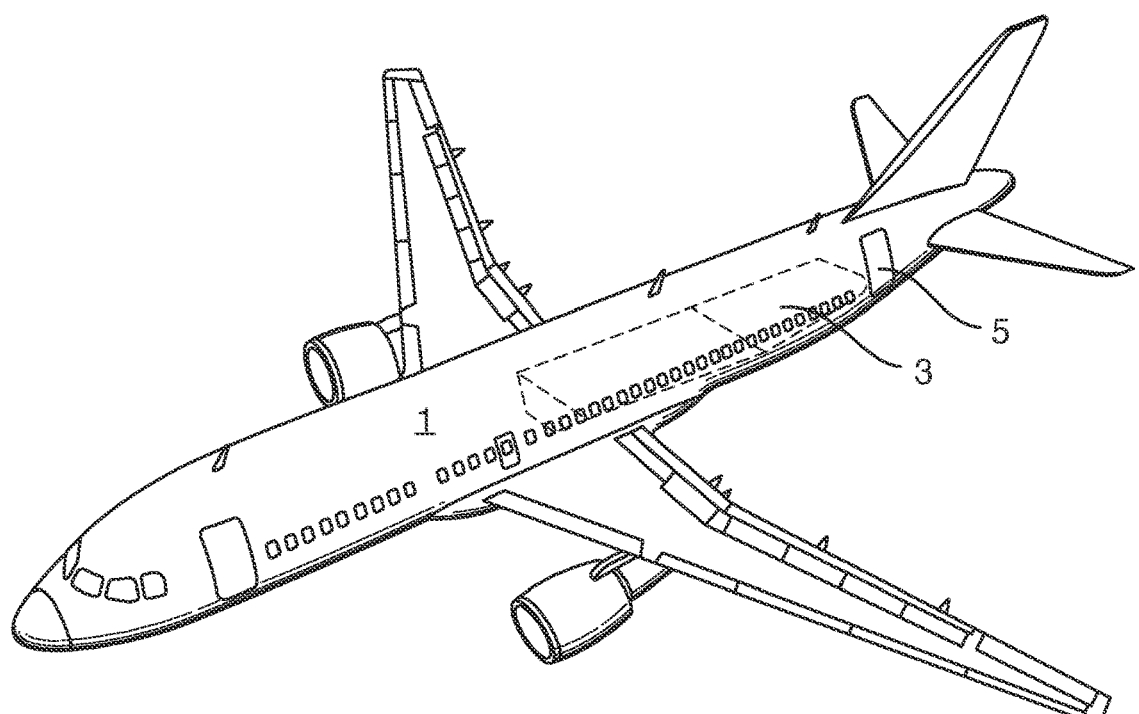
FIG. 1 is a perspective illustration of an aircraft, in which the embodiments of freight carriers according to the disclosure herein can be received.

Embodiments of freight carriers which are provided to be loaded into an aircraft 1 shown in FIG. 1 are described below, wherein the freight carriers can be loaded both into the actual freight space 3 and through the passenger cabin doors 5 into the passenger cabins if the cabin has been converted by removing the passenger seats in order to receive freight. In this instance, the embodiments of the freight carriers are configured in such manner that they can be moved in a simple manner by operators both within the actual freight space 3 and within the passenger cabin.

Figure 2:
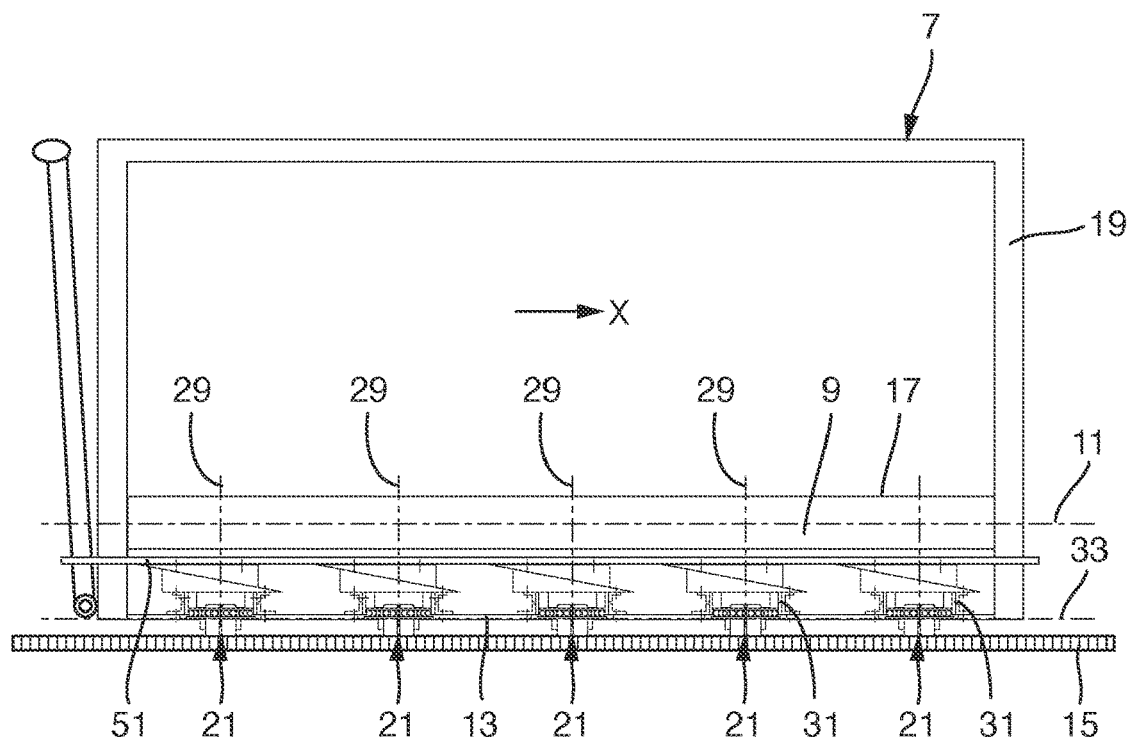
FIG. 2 shows a first embodiment of a freight carrier according to the disclosure herein as a longitudinal section, wherein the retention members are in the deployed position.

As can be derived from FIG. 2, a first embodiment of a freight carrier 7 according to the disclosure herein has a base element 9 which extends in the first embodiment shown in this instance in a base element plane 11, and the base element 9 has a support side 13 which is arranged and configured in such a manner that during normal use of the freight carrier 7 it faces a base face 15 of the freight region in which the freight carrier 7 is intended to be received. In this instance, the freight region, may be, on the one hand, a freight space of an aircraft 1 but also the passenger cabin thereof.

Furthermore, the base element 9 has a base face 17 which is arranged at the side of the base element 9 opposite the support side 13 so that the base face 17 faces away from the support side 13. The base face 17 is configured in such a manner that freight elements can be received thereon, wherein there is provided in the embodiments shown in this instance a circumferential wall 19 which extends upwards away from the base face 17 and which laterally limits a receiving space for the freight elements. In the embodiment shown here, the circumferential wall 19 is constructed as a grid. However, it is also conceivable for the circumferential wall 19 to be constructed as a closed wall. In the case of freight elements which are intended to be cooled, such as, for example, chemicals or medicaments, it is further possible for the circumferential wall to have insulating properties or furthermore to comprise receiving devices, for example, for dry ice (not illustrated). Naturally, additionally or alternatively to such a passive cooling, an active cooling which has already been used for some time in known cooling containers, for example, by compressors and nitrogen is also conceivable. Of course, not only a cooling, but also a heating is possible, so that in any case a desired temperature can be maintained over a relatively long time period of the flight duration and beyond.

Figure 8:
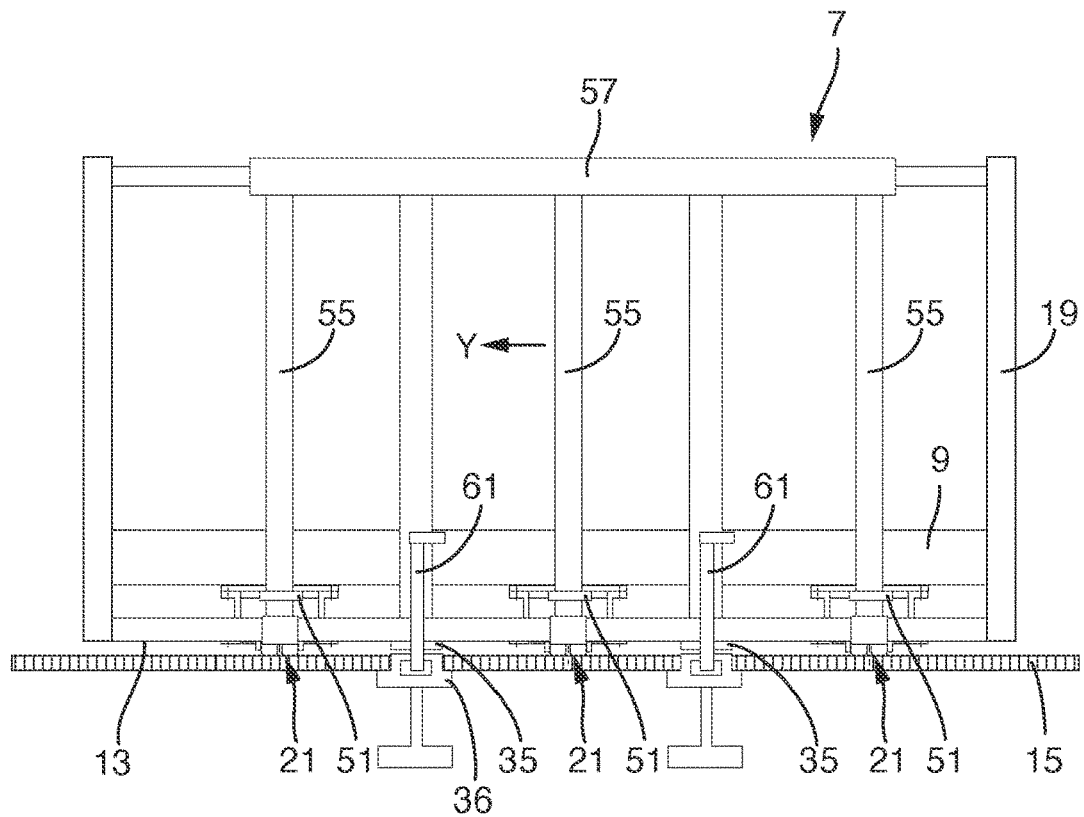
FIG. 8 is a cross section of the embodiment from FIG. 2, wherein locking pins are in the locking position.

As can further be seen in FIG. 2, at the support side 13 of the base element 9 a large number of roller elements 21 are provided. FIGS. 2 and 8, which depict a longitudinal section and a cross section of the freight carrier 7, show that in each case groups of roller elements 21 are fitted in straight lines to the freight carrier 7. The roller elements which extend in a straight line form in this instance a group of roller elements 21 so that FIG. 8 shows that, in the embodiments illustrated in this instance, the roller elements 21 are subdivided into three groups. However, other numbers of straight lines and consequently groups are also possible. In FIG. 2, such a group of roller elements 21 can be seen as a side view.

Figure 3:
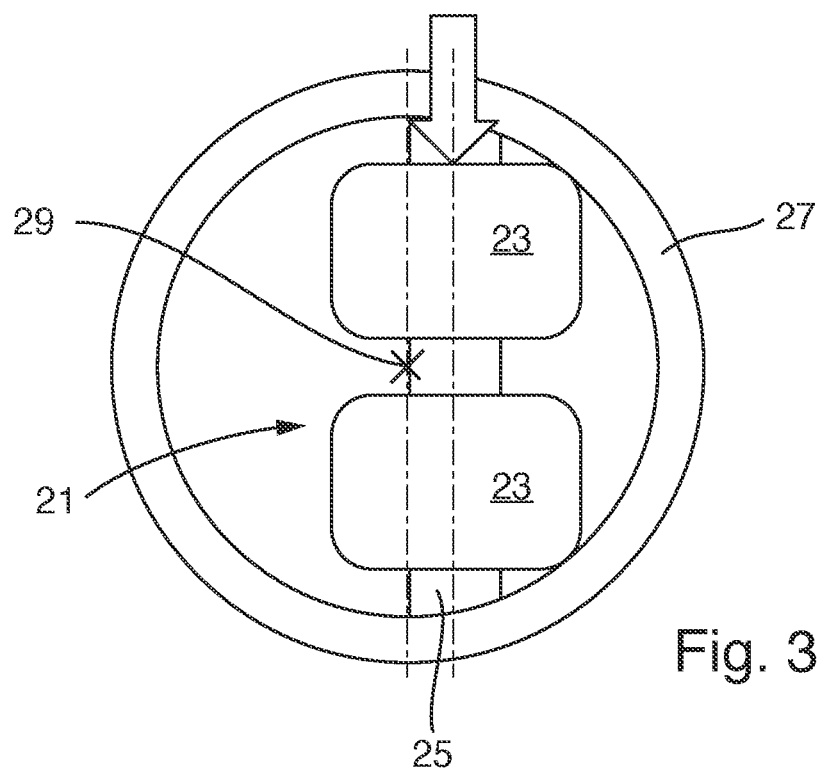
FIG. 3 is a sectioned illustration of a roller element and the retention member for it in a first position relative to a displacement direction.
Figure 4:
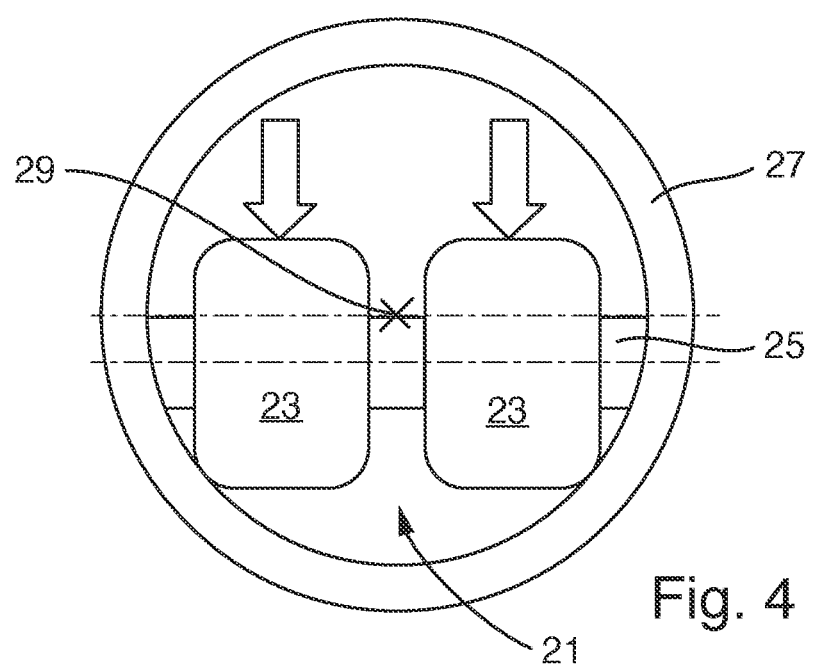
FIG. 4 is a sectioned view of the roller element from FIG. 3 in a second position relative to the displacement direction.
Figure 5:
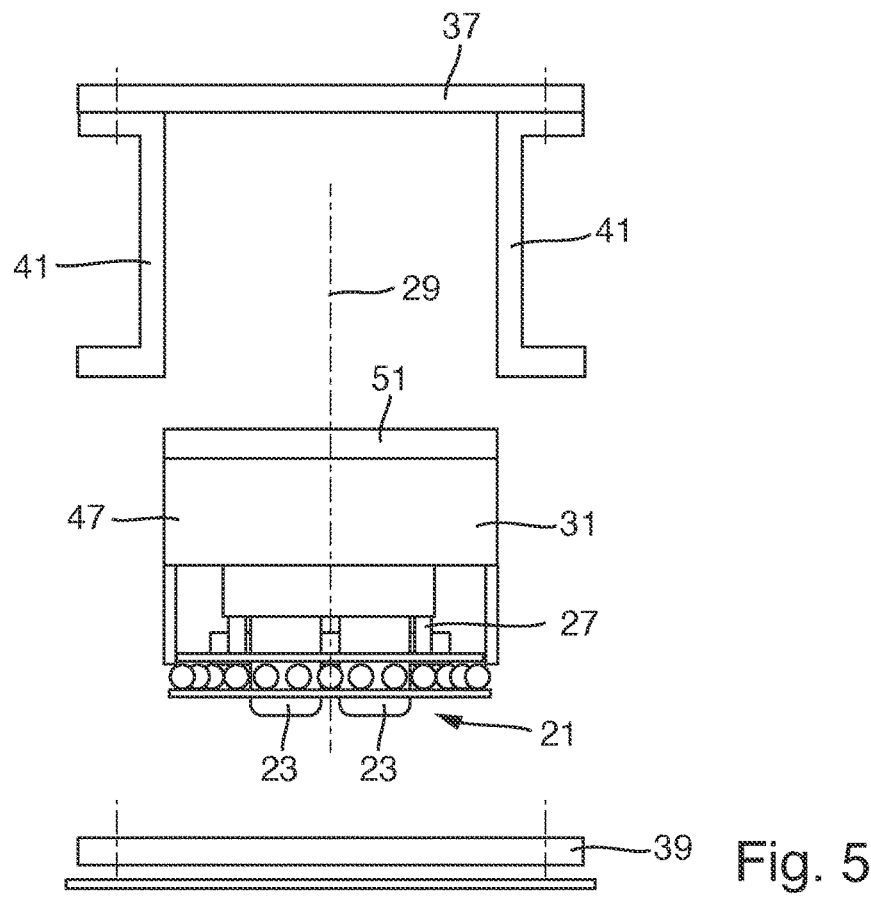
FIG. 5 is a cross section of a portion of the base element of the embodiment from FIG. 2.

FIGS. 3, 4 and 5 show in this instance that the roller elements 21 have two rollers 23 which are arranged parallel with each other and which are both retained so as to be able to be rotated about a common rotation axis 25 in a retention ring 27 which in turn is fitted in a retention member 31 so as to be able to be rotated about a vertical axis 29 which extends perpendicularly to the rotation axis 25. As can also be seen in FIGS. 3 and 4, the rotation axis 25 is arranged relative to the vertical axis 29 in such a manner that the vertical axis 29 does not extend through the rotation axis 25, but instead the rotation axis 25 is arranged offset relative to the vertical axis 29. Consequently, the rotation axis 25 is arranged eccentrically relative to the vertical axis 29. In other words, each vertical axis 29 extends parallel with and with spacing from an axis which extends through the rotation axis 25 of the roller element 21. The effect of this eccentric arrangement is further explained below.

Figure 7:
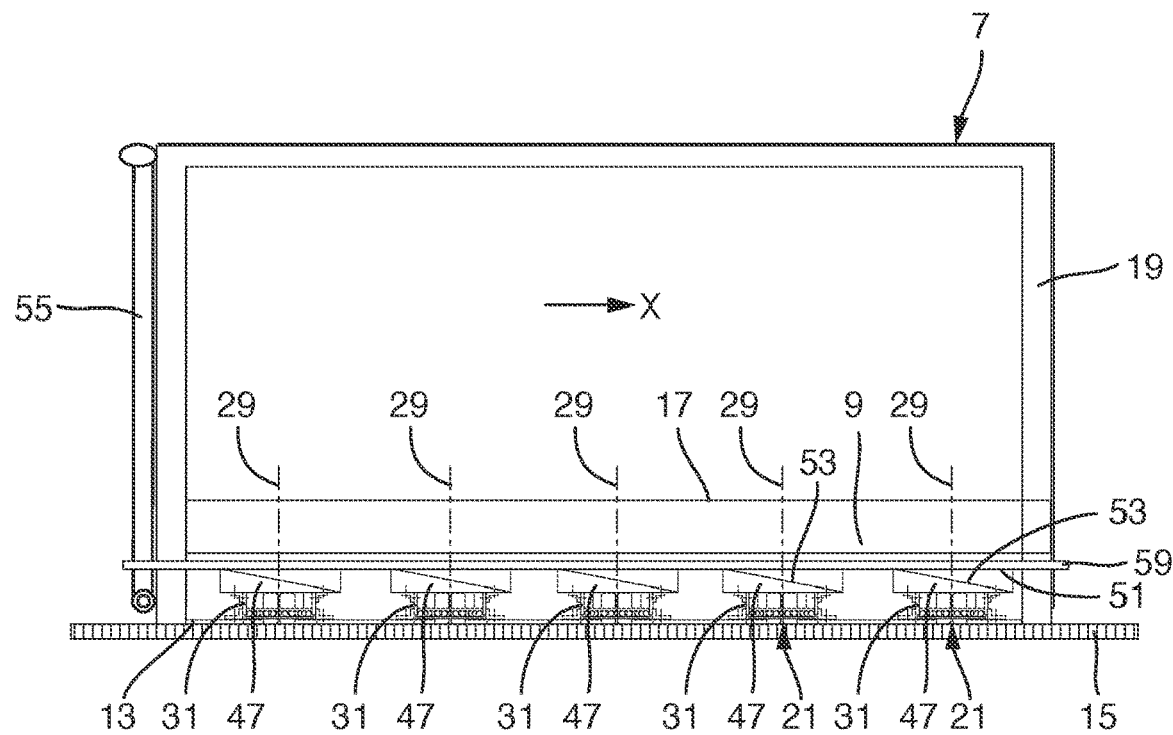
FIG. 7 is a longitudinal section of the embodiment from FIG. 2, wherein the retention members are in the retracted position.

As can further be seen in FIGS. 2 and 7, the retention members 31 in which the roller elements 21 are received are retained in such a manner on the base element 9 that they can be displaced between a deployed position (FIG. 2) and a retracted position (FIG. 7), wherein, in the embodiments shown here, they can be displaced along the respective vertical axis 29, about which the rotation axis 25 of the roller element 21 which is received in the retention member 31 can be rotated. In this instance, it can be seen that, when the retention members 31 are in the deployed position, the spacing of the roller elements 21 from the base face 17 is greater than when the roller elements 21 and the retention members 31 which receive them are in the retracted position (see FIG. 7).

Furthermore, it can be seen in FIG. 2 that, when the retention members 31 are in the deployed position, the rotation axes 25 of the roller elements 21 are arranged in a common rotation axis plane 33. Furthermore, it can be seen in FIGS. 8 and 9 that the support side 13 in the embodiments described in this instance is provided with support elements 35 which extend in a common support plane so that, when the retention members 31 with the roller elements 21 are in the retracted position, the roller elements 21 are set back behind the support plane and the support elements 35 are positioned on the base face 15 of the freight region. In this instance, it is in particular possible for the support elements 35 to be arranged in such a manner on the support side 13 of the base element 9 that they are spaced apart in accordance with the rails 36 in the base face 15 of the passenger cabin of the aircraft 1, in which base face the freight carriers 7 are intended to be received. It is then ensured that the loads as a result of the freight carriers 7 are introduced into the base face 15 at locations where it is in any case configured to receive loads.

It has already been described in connection with FIGS. 3 and 4 that with each roller element 21 the vertical axis 29 is offset perpendicularly to the rotation axis 25, about which the roller element 21 can be rotated. In particular with each roller element 21, the vertical axis 29 is spaced apart parallel with an axis which extends through the rotation axis 25 of the roller element 21 and perpendicularly to the rotation axis plane 33. This has the effect indicated in FIGS. 3 and 4 using arrows. When the freight carrier 7 is acted on with a force by an operator counter to the direction of the arrow in order to displace the freight carrier 7 counter to the direction of the arrow, the eccentric arrangement of the rotation axis 25 results in the rotation axis 25 moving about the vertical axis 29 and being orientated in such a manner that it is perpendicular to the direction counter to which the freight carrier 7 is intended to be moved. The eccentric arrangement of the rotation axis 25 relative to the vertical axis 29 thus has the effect that the roller elements 21 are independently orientated in such a manner that the resistance which they apply to a displacement on the base face 15 is minimised.

Figure 6:
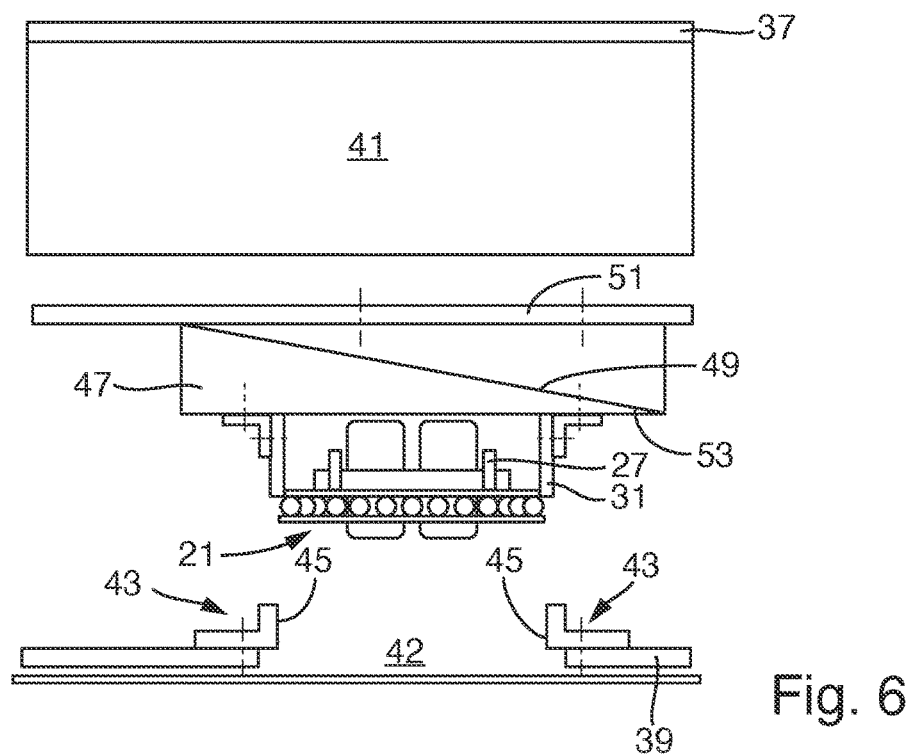
FIG. 6 is a longitudinal section of a portion of the base element of the embodiment from FIG. 2.
Figure 11:
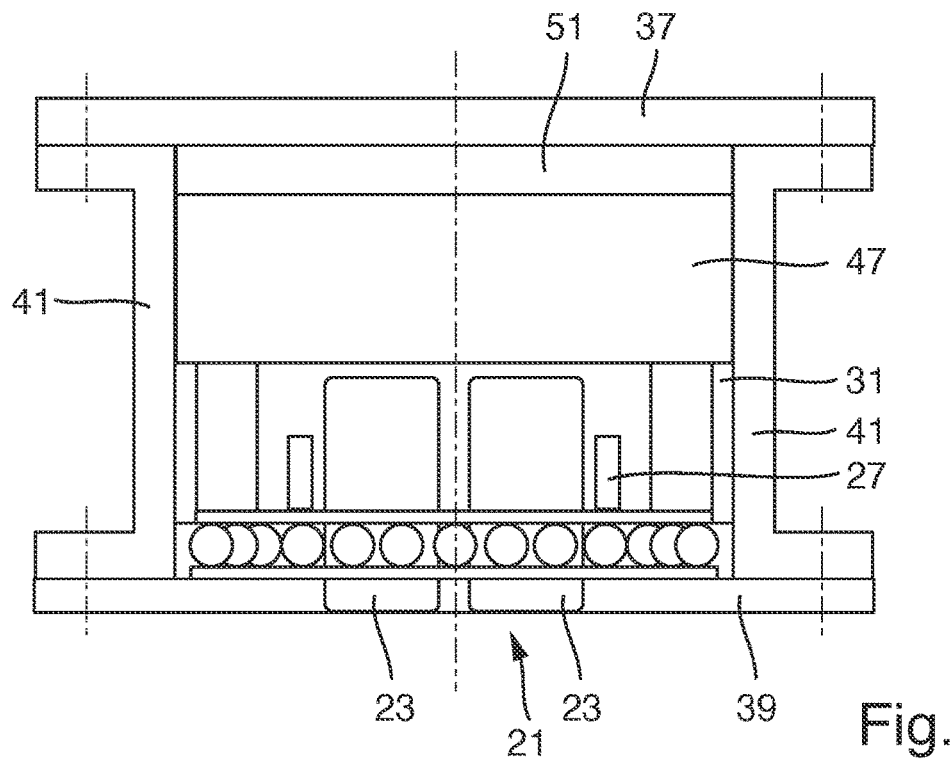
FIG. 11 is a cross section of a portion of the base element of the embodiment from FIG. 2, wherein the upper and the lower covering plate are connected to each other by profile elements.
Figure 12:
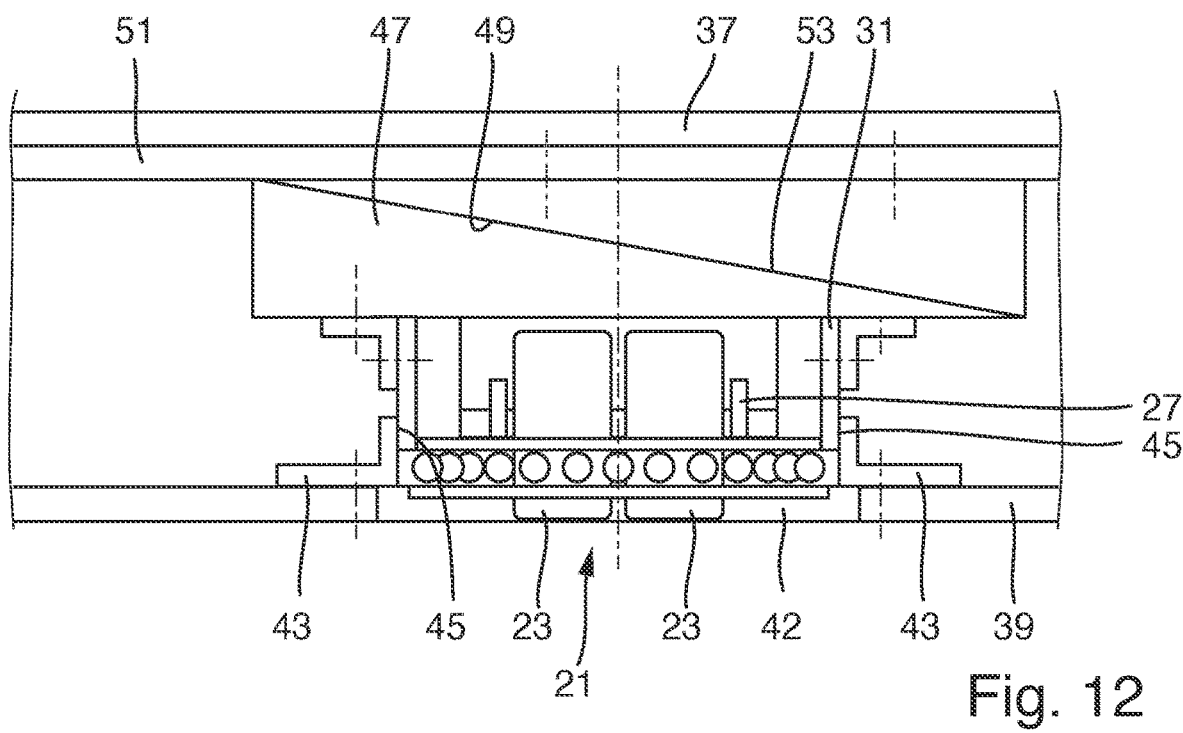
FIG. 12 is a longitudinal section of a portion of the base element of the embodiment from FIG. 2, wherein the upper and the lower covering plate are connected to each other by the profile elements.

The mechanism by which in the first embodiment the retention members 31 can be displaced relative to the base element 9 along the vertical axis 29 between the retracted and the deployed position will now be described. This mechanism is shown in FIGS. 5 and 6 in a separated form, whilst FIGS. 11 and 12 show the mechanism in the assembled form thereof.

In this context, it should be noted that the base element 9 in the embodiments described in this instance, generally has an upper covering plate 37 and a lower covering plate 39 between which profile elements 41 are arranged, wherein the profile elements 41 connect the upper covering plate 37 and the lower covering plate 39 to each other. The retention members 31, on which the roller elements 21 of a first group of roller elements are fitted to the freight carrier 7, are arranged between two profile elements 41 in each case. Since the roller elements 21 on the freight carrier 7 comprise a plurality of groups and the roller elements 21 of a group are arranged along a linearly extending line on the base element 9, the profile elements 41, between which the retention members 31 of the group of roller elements 21 are arranged, extend along the line towards which the roller elements 21 are orientated on the freight carrier 7. In the same manner, in the embodiments described in this instance, the roller elements 21 of the other group are also fitted along the respective straight line on the base element 7.

The retention members 31 with the roller elements 21 fitted thereon have a width which corresponds to the spacing of the profile elements 41 so that the retention members 31 are guided between the profile elements 41 in the direction of the vertical axis 29. This can be seen in FIGS. 5 and 11. Furthermore, there are provided in the lower covering plate 39 openings 42, through which the roller elements 21 can extend when they are displaced into the deployed position. In a state adjacent to the openings 42 there are fixed to the lower covering plate 39 angular guiding members 43 which have guiding faces 45 which extend transversely relative to the line along which the roller elements 21 of the group are arranged on the base element 9 in order to guide the retention members 31 transversely relative to this line.

As a result of the profile elements 41 and the angular guiding members 43 with the guiding faces 45, the retention members 31 are thus guided in such a simple manner that they can carry out only a vertical movement perpendicularly to the rotation axis plane 33, whilst they are prevented from moving parallel with the rotation axis plane 33 by these components.

In the first embodiment of a freight carrier 7 as shown in FIGS. 2 to 12, the retention members 31 are displaced with the roller elements 21 of a group in each case between the retracted and the deployed position by the retention members 31 above the roller elements 21 having a wedge 47, on which an engagement face 49 which extends in an inclined manner at an angle of less than 90° with respect to the vertical axis 29 of the respective retention member 31 is provided. Accordingly, each retention member 31 thus has an engagement face 49 which is inclined with respect to the vertical axis 29 about which the roller element 21 can be rotated in the retention member 31.

Furthermore, there is provided for each group of roller elements 21 in the first embodiment of a freight carrier 7 an actuation rod 51 which extends along the line along which the roller elements 21 of the respective group are arranged. In particular, the actuation rod 51 extends between the profile elements 41 and is laterally guided thereby along the line towards which the roller elements 21 are orientated. The actuation rod 51 has counter-faces 53 which extend in an inclined manner, wherein a counter-face 53 is associated with each retention member 31 along the line along which the actuation rod 51 extends. The counter-faces 53 are located in the embodiment described in this instance in a planar manner on the engagement faces 49.

When the actuation rod 51 is displaced parallel with the profile elements 51 in the base element 9 from a retracted position (FIG. 7) into a deployed position (FIG. 2), the counter-faces 53 slide over the engagement faces 49 and in this instance result in the retention members 31 being moved from the retracted position into the deployed position. If, vice versa, the actuation rod 51 is displaced from the deployed into the retracted position, the retention members 31 can slide back from the deployed position into the retracted position into the base element 9, wherein they are guided in this instance by the profile elements 41 and the angular guiding members 43.

In order to move the actuation rods 51, there are pivotably retained on the base element 9 actuation arms 55 which are coupled to the actuation rods 51 so that, by pivoting the actuation arms 55, the actuation rods 51 can be moved back and forth between the retracted and the deployed position. In the preferred embodiment illustrated in this instance, the actuation rods 55 are additionally coupled by a transverse rod 57 for common movement.

Figure 10:
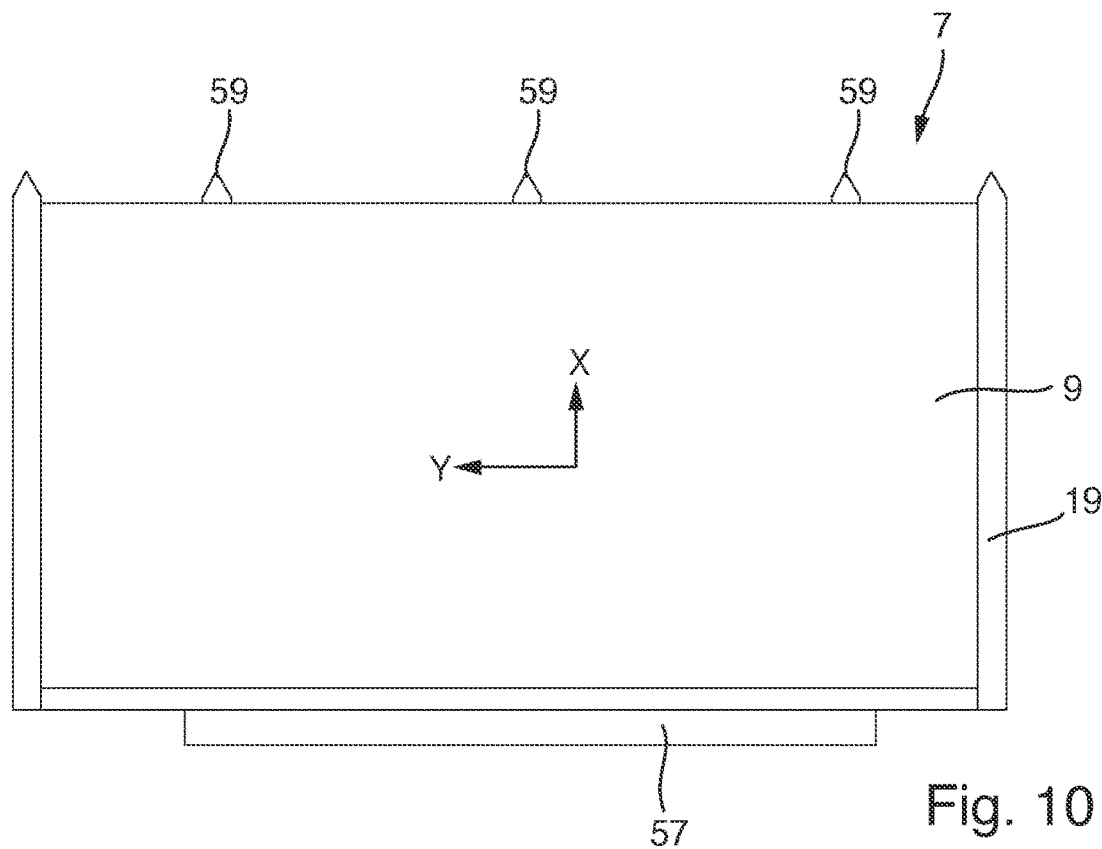
FIG. 10 is a plan view of the embodiment from FIG. 2, wherein actuation rods are in the retracted position so that the first ends thereof extend from the base element.

FIGS. 2, 7 and 10 additionally show that the actuation rods 51 are constructed in such a manner that an end 59 thereof extends to a first extent from the base element 9 when the actuation rod 51 is in the inserted position. If the actuation rod 51 is in the deployed position, however, the end 59 protrudes either not at all or only to a slight extent over the rim or edge of the base element 9.

Furthermore, according to the embodiments described in this instance, the base elements 9 have at the edge opposite the protruding end 59 of the actuation rod 51 receiving recesses which are constructed to receive the ends 59 of the actuation rod 51 of another freight carrier 7. In this manner, it is possible for, when the freight carriers 7 have reached their end position on the base face 15 in the freight region in which adjacent freight carriers 7 are directly in abutment with each other, the actuation rods 51 to be moved by the actuation arms 55 into the inserted position and in this instance, on the one hand, for the retention members 31 with the roller elements 21 to be moved into the retracted position so that the freight carriers can no longer be readily pushed over the base face 15 and, on the other hand, for the ends 59 of the actuation rods 51 of a first freight carrier 7 to engage with the receiving recesses of another freight carrier 7 and thus for them to be locked to each other. In this manner, an assembly of freight carriers 7 is produced and prevents the freight carriers 7 in the freight region from being able to be moved in a vertical direction, in particular in the event of landing impacts.

Figure 9:
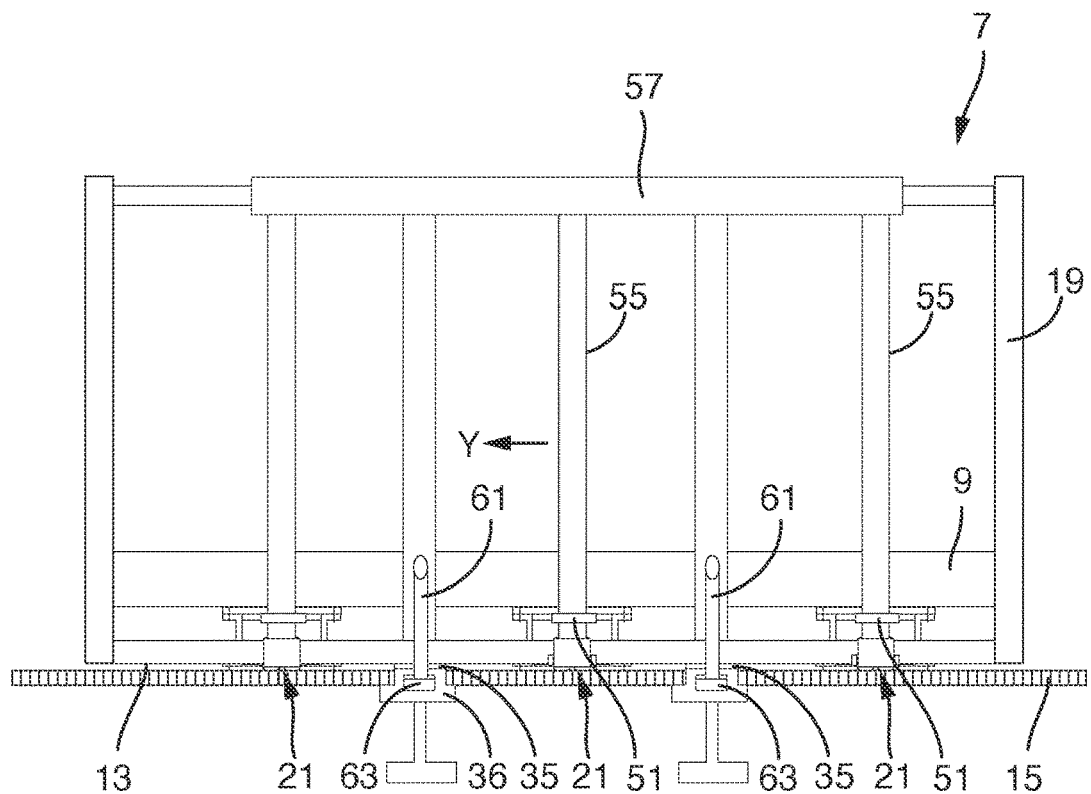
FIG. 9 is a cross section of the embodiment from FIG. 2, wherein locking pins are also in the locking position, but are rotated with respect to the view shown in FIG. 6.

Finally, it is shown in FIGS. 8 and 9 that the embodiments of the freight carriers 7 according to the disclosure herein have locking pins 61 which are fitted to the base element 9 of the freight carrier and which can be displaced in a direction perpendicular to the rotation axis plane 33 and consequently also perpendicularly to the base element 9 between a locking position and a release position, wherein in FIGS. 8 and 9 the locking pins 61 are illustrated in each case in the locking position.

In this instance, it is also possible for the locking pins 61 to be fitted to the base element 9 in such a manner that they can be displaced parallel with the plane thereof and consequently parallel with the rotation axis plane 33 and support plane on the base element 9 in order to adapt the position of the locking position to the rails 36 for passenger seats in the freight region of the aircraft, in which the freight carriers 7 are intended to be received.

In the embodiment shown in FIGS. 8 and 9, the locking pins 61 are provided with a locking element 63 at the free end thereof so that the locking pins 61 can be moved into engagement with the rails 36 for passenger seats in the base face 15 of a freight region by rotating the locking pins 61 in such a manner that the locking pins 61 can then no longer be vertically displaced into the release position without rotating the locking pins 61 back. A locking of the freight carriers 7 against a movement in a vertical direction can also thereby be achieved.

In FIGS. 13 to 16, the mechanism for displacing the retention pins 31, in which the roller elements 21 of a group of the roller elements are retained, of a second embodiment of a freight carrier 7 according to the disclosure herein is illustrated. This embodiment corresponds to the first embodiment with the exception of the displacement mechanism so that only the differences with respect to the first embodiment are explained below.

Figure 14:
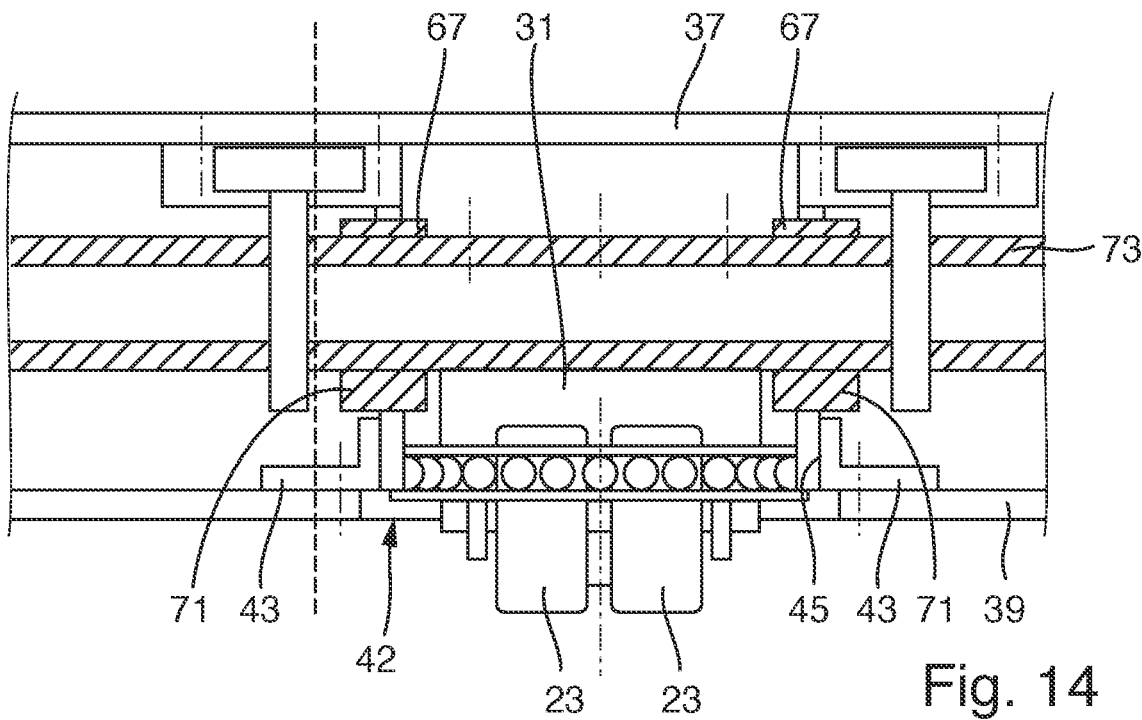
FIG. 14 is a longitudinal section of a portion of the base element of the second embodiment, wherein the retention members are in the deployed position.
Figure 16:
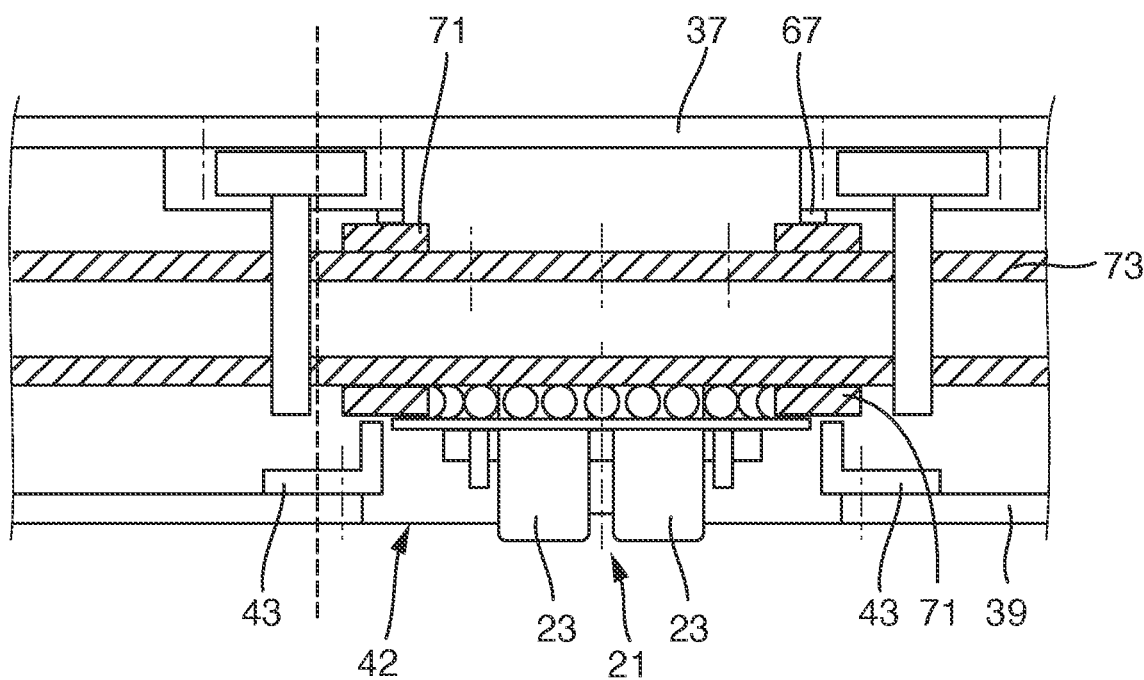
FIG. 16 is a longitudinal section of a portion of the element of the second embodiment, wherein the retention elements are in the retracted position.

Also in the second embodiment, there are again provided in the base element 9 profile elements 41 which are provided between an upper covering plate 37 and a lower covering plate 39 and between two of these profile elements 41 in each case there are arranged the retention members 31 on which the roller elements 21 of a first group of roller elements 21 are retained. Furthermore, in this embodiment, the retention members 31 have a guiding block 67 in which circular through-holes 69 are formed. The inner face of the through-holes 69 forms an abutment face against which there abut cam elements 71 which are fitted in a rotationally secure manner to a cam rod 73 which extends between the profile elements 41 parallel with the line along which the roller elements 21 of the first group are arranged. In this instance, in the embodiment described here, there are associated with each retention member 31 which retains one of the roller elements 21 of the first group at least one cam element 71 which is/are received in each case in a through-hole 69 in a guiding block 67. In the present embodiment, there are associated with each retention member 31 two cam elements 71 which are received in two through-holes in the guiding block 67, as can be seen in FIGS. 14 and 16.

In this embodiment, the cam elements 71 are constructed in the form of a circular ring so that they abut the inner face of the through-holes 69 in the guiding blocks 67 over the entire face. However, the significant aspect is that the cam elements 71 abut a base portion 75 of the abutment face, wherein this base portion 75 is arranged between the cam rod 73 and the rotation axis plane 33. As a result of the fact that the cam elements 71 abut against at least the base portion 75, the cam elements 71 can press the retention members 31 out of the base element 9 into the deployed position or enable the retention members 31 to move back into the retracted position into the base element 9. This can be implemented by rotating the cam rod 73.

As a result of the fact that the cam elements 71 are constructed in the form of a circular ring, and in this embodiment abut the inner face of the through-holes 69 over the entire face, it is possible for the load of the retention members 31 to be transmitted over a large surface portion to the cam elements 71 so that this structure is extraordinarily stable.

With this structure, however, it is also necessary for the cam rod 73 to be retained parallel with the rotation axis plane 33 perpendicularly to the profiles 41 so as to be able to be displaced relative to the profiles 41, whilst it has to be non-displaceable perpendicularly relative to the rotation axis plane 33.

The displaceability parallel with the rotation axis plane 33 is required since the retention members 31 as a result of the profiles 41 and the abutment thereof against them cannot be displaced parallel with the rotation axis plane 33 perpendicularly to the profiles 41. Since the cam elements 71 when they are rotated in the through-holes 69 are in abutment therewith over the entire face and are therefore laterally deflected, however, the cam rod 73 must be able to follow this movement. However, it must not be able to be displaced perpendicularly to the rotation axis plane 33 since the retention members 31 would otherwise not be able to be vertically displaced in the event of a displacement of the cam rod 73.

Figure 13:
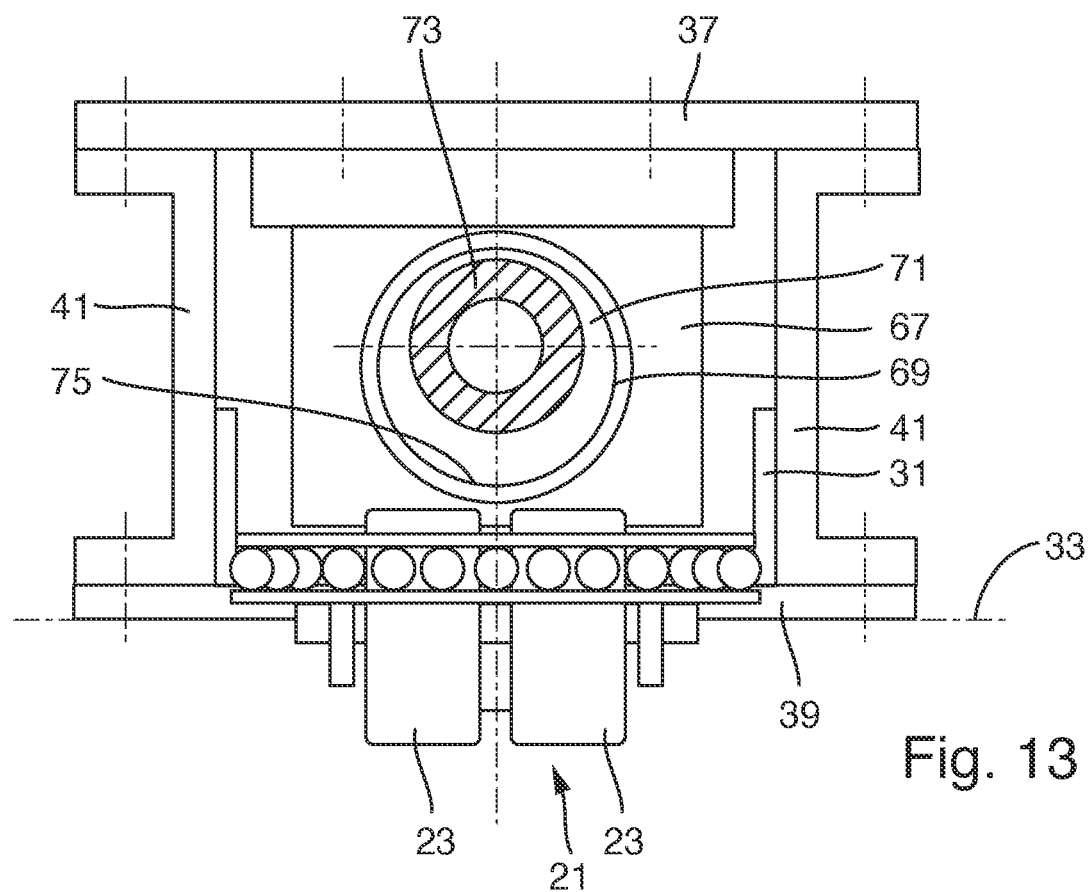
FIG. 13 is a cross section of a portion of the base element of a second embodiment of a freight carrier according to the disclosure herein, wherein the retention members are in the deployed position.

A comparison of FIGS. 13 and 14 with FIGS. 15 and 16 shows again the operating method of the adjustment mechanism for the retention members 31 according to the second embodiment.

Figure 15:
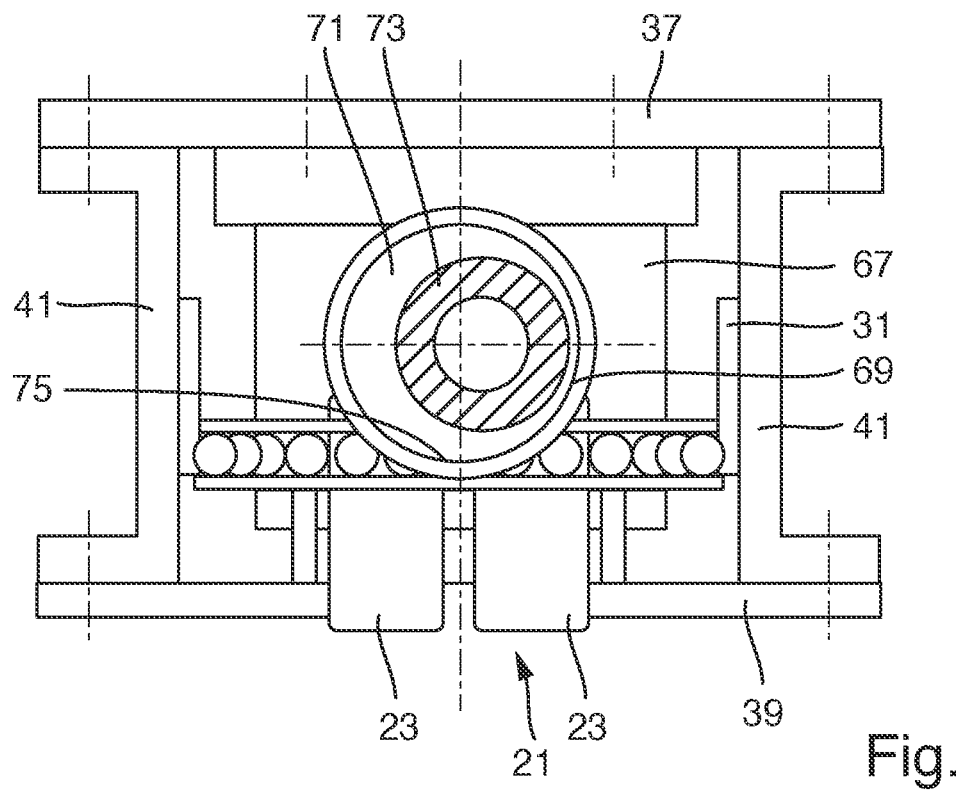
FIG. 15 is a cross section of a portion of the base element of the second embodiment wherein the retention members are in the retracted position.

FIGS. 13 and 14 show that the cam elements 71 are orientated in such a manner that the region furthest away from the longitudinal axis of the cam rod 73 faces downwards so that the retention member 31 is thereby pressed with the roller element 21 out of the base element 9 into the deployed position. However, when the cam rod is rotated through 90° relative to this position, as shown in FIGS. 15 and 16, the retention member 31 with the roller elements 21 can move into the base element 9 into the retracted position. In this instance, the roller elements 21 no longer protrude over the support plane and the freight carrier 7 is positioned with the support elements 35 which are provided thereon on the base face 15.

In order to pivot the cam rod 73, it is advantageous for there to be provided on the end thereof which protrudes from the base element 9 an actuation arm, by which the cam rod 73 can be pivoted between the two pivot positions thereof.

Consequently, the second embodiment of a freight carrier 7 according to the disclosure herein also enables, in a simple manner, the roller elements 21 which are fitted to the base element 9 to be displaced between the retracted position and the deployed position.

Figure 17:
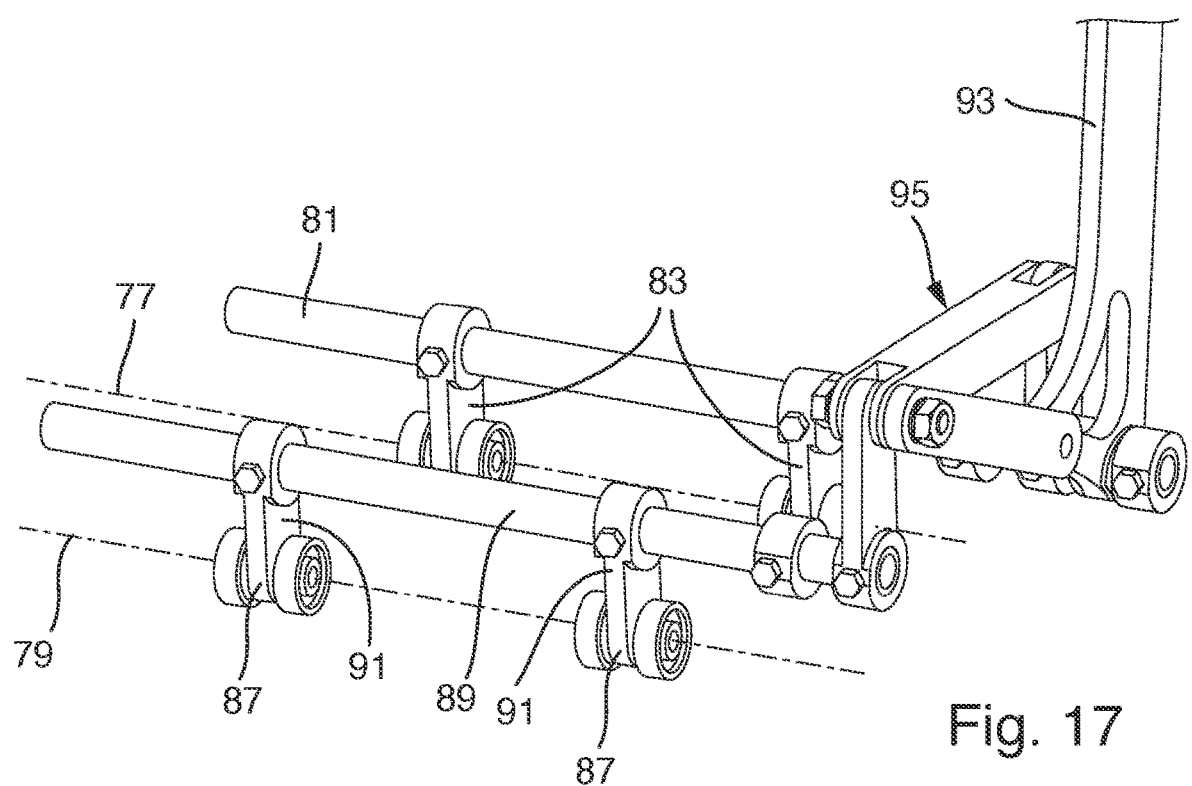
FIG. 17 is a perspective illustration of the actuation mechanism for the retention members of a freight carrier according a third embodiment, wherein the actuation mechanism comprises two lever rods which are arranged parallel with each other.
Figure 18:
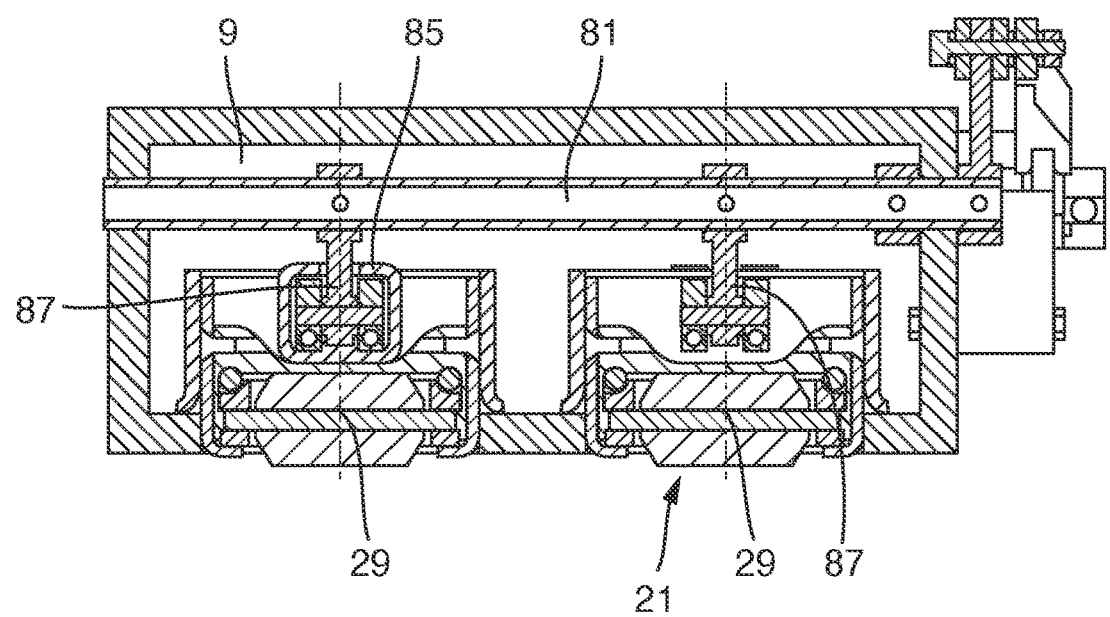
FIG. 18 is a cross section of the mechanism shown in FIG. 15.

Finally, FIGS. 17 and 18 illustrate the actuation mechanism from a third embodiment for displacing the retention members 31 to which the roller elements 21 of a first group and a second group of roller elements 21 are fitted. In this instance, the roller elements 21 of the first group are arranged along a first line 77, whilst the roller elements 21 of the second group are arranged along a second line 79, which are illustrated only schematically in FIG. 17. Furthermore, the third embodiment corresponds to the embodiments described above, and only the different actuation mechanism by which the retention members 31 are displaced will be explained below.

The mechanism of the third embodiment comprises a first lever rod 81 which extends parallel with the first line 77 and to which first lever elements 83 are fitted in a rotationally secure or non-rotational manner. As can be seen in FIG. 18, a first lever element 83 is associated with each retention member 31 which receives roller elements 21 of the first group, wherein each retention member 31 additionally has a guide rail 85 which extends in the third embodiment illustrated in this instance perpendicularly to an extent direction of the first lever rod 81 and additionally extends perpendicularly to the vertical axis 29, about which the rotation axis of the roller element 21 which is retained in the retention member 31 can be rotated. In the guide rails 85, the free ends 87 of the first lever elements 83 which are remote from the first lever rod 81 are guided by ball bearings.

In a quite similar manner, there is provided a second lever rod 89 which extends parallel with the second line 79 and to which there are fitted in a rotationally secure manner second lever elements 91 whose free ends are also received in guide rails in the retention members 31 on which the roller elements 21 which belong to the second group and which are arranged along the second line 79 are retained.

When the lever rods 81, 89 are pivoted, the lever elements 83, 91 which are fitted thereto are also pivoted, whereby the retention members 31 with the roller elements 21 retained thereon are moved in a vertical direction.

As can further be seen in FIG. 17, there is secured to the first lever rod 81 a lever arm 93 by which the first lever rod 81 can be pivoted about the longitudinal axis thereof. There is further provided between the first lever rod 81 and the second lever rod 89 a lever arm arrangement 95 by which the first lever rod 81 and the second lever rod are coupled to each other. When the first lever rod 81 is pivoted by the lever arm 93, the lever arm arrangement 95 leads to the second lever rod 89 also being pivoted. Accordingly, a pivot movement of the lever arm 93 also leads to a pivot movement of the second lever rod 89. In the third embodiment, therefore, the roller elements 21 can also be moved in a simple manner between the retracted and the deployed position.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS

1 Aircraft
3 Freight space
5 Passenger cabin door
7 Freight carrier
9 Base element
11 Base element plane
13 Support side
15 Base face
17 Base face
19 Circumferential wall
21 Roller element
23 Rollers
25 Rotation axis
27 Retention ring
29 Vertical axis
31 Retention member
33 Rotation axis plane
35 Support elements
36 Rail
37 Upper covering plate
39 Lower covering plate
41 Profile element
42 Opening
43 Angular guiding member
45 Guiding faces
47 Wedge
49 Engagement face
51 Actuation rod
53 Counter-face
55 Actuation arm
57 Transverse rod
59 End of actuation rod
61 Locking pin
63 Locking element
67 Guiding block
69 Through-hole
71 Cam element
73 Cam rod
75 Base portion
77 First line
79 Second line
81 First lever rod
83 First lever elements
85 Guide rail
87 Free end of the lever element
89 Second lever rod
91 Second lever elements
93 Lever arm
95 Lever arm arrangement

The invention claimed is:

1. A freight carrier for being received in a freight region of an aircraft, the freight carrier comprising:
   a base element comprising:
      a support side that comprises a plurality of rollers elements and is arranged such that the freight carrier can be positioned on a base surface of the freight region of the aircraft, with the support side opposite from the base surface;
      a base face arranged at a side of the base element that faces away from the support side; and
      a plurality of retainers;
   wherein the freight carrier is movable over the base surface, which extends in a base plane, such that the support side faces the base surface;
   wherein each of the roller elements is retained on a corresponding one of the plurality of retainers, such that each of the roller elements is to be rotatable about a rotation axis;
   wherein each of the retainers is displaceable between a deployed position and a retracted position;
   wherein a spacing of the roller elements from the base face is greater when the plurality of retainers are in the deployed position than when the plurality of retainers are in the retracted position;
   wherein each of the rotation axes of the roller elements are arranged in a common rotation axis plane when the retainers are in the deployed position;
   wherein the roller elements are retained on the base element such that the rotation axis of each of the roller elements can be rotated about a vertical axis that extends parallel with, and with spacing from, an axis that extends through the rotation axis of the roller element and perpendicularly to the common rotation axis plane;
wherein the roller elements comprise a plurality of groups of roller elements;
wherein the retainers, in which the roller elements of a first group of the plurality of groups of roller elements are retained, are retained in a manner configured for displacement, along a linearly extending first line on the base element, between the retracted and the deployed position; and
wherein the first line extends parallel with the common rotation axis plane.

2. The freight carrier according to claim 1, wherein each of the retainers is displaceable along the vertical axis relative to the base element, between the retracted position and the deployed position.

3. The freight carrier according to claim 1, wherein:
the support side comprises support elements arranged in a support plane;
when the roller elements are in the deployed position, the roller elements protrude over the support plane; and
when the roller elements are in the retracted position, the roller elements are behind the support plane.

4. The freight carrier according to claim 3, wherein:
the base element comprises locking pins which extend perpendicularly to the support plane and are retained on the base element for displacement perpendicularly to the support plane, so that the locking pins are displaceable between a release position and a locking position;
when the locking pins are in the locking position, a free end of the locking pins protrudes over the support plane; and
when the locking pins are in the release position, thereof the free end of the locking pins is arranged in the support plane or at the side of the support plane, facing away from the rotation axis.

5. The freight carrier according to claim 4, wherein a position of the locking pins on the base element is adjustable parallel with the support plane.

6. The freight carrier according to claim 1, wherein:
each of the retainers, in which the roller elements of the first group are retained, has an engagement face which extends in an inclined manner, at an angle of less than 90° with respect to the vertical axis;
for at least the roller elements of the first group, there is an actuation rod which extends along the first line and which has counter-faces, which are opposite the engagement faces, extend in an inclined manner, and are in planar abutment with the engagement faces;
the actuation rod is retained for displacement along the first line in the base element, so the actuation rod is displaceable between an inserted position and a deployed position;
a displacement of the actuation rod from the inserted position into the deployed position displaces the retainers, in which the roller elements of the first group are retained, from the retracted position into the deployed position.

7. The freight carrier according to claim 6, comprising an actuation arm pivotably retained on the base element, wherein, for at least the roller elements of the first group, the actuation rod is articulated to the actuation arm and a pivoting of the actuation arm with respect to the base element displaces the actuation rod along the first line.

8. The freight carrier according to claim 6, wherein:
when the actuation rod is in the inserted position, a first end of the actuation rod protrudes over an edge of the base element to a first extent; and
when the actuation rod is in the deployed position:
the first end of the actuation rod is retracted inside the base element; or
the first end of the actuation rod protrudes to a second extent, which is smaller than the first extent.

9. The freight carrier according to claim 8, wherein the base element has, in a surface opposite the first end of the actuation rod, a receiving recess adapted to receive the first end of the actuation rod.

10. The freight carrier according to claim 1, comprising a cam rod in the base element which extends along the first line and which has cam elements, which are connected thereto in a rotationally secure manner;
wherein the cam rod is rotatable about an axis which extends parallel with the common rotation axis plane and the first line;
wherein one of the cam elements is associated with each of the retainers, in which the roller elements from the first group are retained;
wherein each of the retainers, in which the roller elements from the first group are retained, has an abutment face which comprises at least one base portion;
wherein the base portion, when viewed in a direction perpendicular to the common rotation axis plane, is between the cam rod and the common rotation axis plane; and
wherein the cam elements abut the base portion of the abutment face of the retainer associated with the cam element.

11. The freight carrier according to claim 10, wherein:
each of the retainers, in which the roller elements from the first group are retained, has a circular hole whose inner face forms the abutment face and through which the cam rod extends; and
the cam elements have a circular cross section and abut the abutment face over an entire extent thereof.

12. The freight carrier according to claim 1, comprising:
a first lever rod pivotably retained on the base element;
wherein the first lever rod extends parallel with the first line;
wherein a plurality of lever elements are secured to the first lever rod in a non-rotatable manner;
wherein a first lever element of the plurality of lever elements is associated with each of the retainers, in which the roller elements from the first group are retained;
wherein the retainers, in which the roller elements from the first group are retained, have guide rails which are configured to receive a free end of the first lever element which is associated with the retainer, such that the free end of the first lever element is displaceable in a direction transverse to the vertical axis, about which the retainer associated with the first lever element can be rotated, and cannot be displaced parallel with this vertical axis;
wherein the guide rails extend perpendicularly to a direction of extension of the first lever rod; and
wherein a lever arm is coupled to the first lever rod.

13. The freight carrier according to claim 12, wherein the retainers, in which the roller elements of a second group of the plurality of groups of roller elements are retained, are displaceable along a linearly extending second line on the base element, between the retracted position and the deployed position, wherein the second line extends parallel with the first line;

the freight carrier comprising:
a second lever rod pivotably retained on the base element;
wherein the second lever rod extends parallel with the second line;
wherein a plurality of second lever elements are secured to the second lever rod in a non-rotatable manner;
wherein a second lever element of the plurality of lever elements is associated with each of the retainers, in which the roller elements from the second group are retained;
wherein the retainers, in which the roller elements from the second group are retained, have second guide rails configured to receive a first end of the second lever element which is associated with the retainer, such that the free end of the second lever element is displaceable in a direction transverse to the vertical axis, about which the retainer associated with the second lever element is rotatable and cannot be displaced parallel with this vertical axis;
wherein the second guide rails extend perpendicularly to a direction of extension of the second lever rod; and
wherein the second lever rod is coupled to the first lever rod such that a pivot movement of the lever arm causes a pivot movement of the second lever rod.

14. The freight carrier according to claim 1, wherein the base element has an upper covering plate and a lower covering plate;
the freight carrier
comprising a first profile element and a second profile element, which extend parallel with each other and with the first line, between the upper covering plate and the lower covering plate;
wherein the retainers, in which the roller elements from the first group are retained, abut the first profile element and the second profile element and are guided by the first profile element and the second profile element in a direction perpendicular to the common rotation axis plane;
wherein the upper covering plate and/or the lower covering plate comprise angular guiding members formed thereon;
wherein the angular guiding members have guiding faces which extend in a transverse direction relative to the first line; and
wherein the retainers, in which the roller elements from the first group are retained, abut the guiding faces of the angular guiding members.

15. A freight carrier for being received in a freight region of an aircraft, the freight carrier comprising:
a base element comprising:
a support side that comprises:
a plurality of support elements arranged in a support plane; and
a plurality of rollers elements;
wherein the support side is arranged such that the freight carrier can be positioned on a base surface of the freight region of the aircraft, with the support side opposite from the base surface;
a base face arranged at a side of the base element that faces away from the support side;
a plurality of retainers; and
locking pins;
wherein the freight carrier is movable over the base surface, which extends in a base plane, such that the support side faces the base surface;
wherein each of the roller elements is retained on a corresponding one of the plurality of retainers, such that each of the roller elements is rotatable about a rotation axis;
wherein each of the retainers is displaceable between a deployed position and a retracted position;
wherein a spacing of the roller elements from the base face is greater when the plurality of retainers are in the deployed position than when the plurality of retainers are in the retracted position;
wherein each of the rotation axes of the roller elements are arranged in a common rotation axis plane when the retainers are in the deployed position;
wherein the roller elements are retained on the base element such that the rotation axis of each of the roller elements can be rotated about a vertical axis that extends parallel with, and with spacing from, an axis that extends through the rotation axis of the roller element and perpendicularly to the common rotation axis plane;
wherein, when the retainers are in the deployed position, the roller elements protrude over the support plane and, when the retainers are in the retracted position, the roller elements are behind the support plane;
wherein the locking pins extend perpendicularly to the support plane and are retained on the base element for displacement perpendicularly to the support plane, so that the locking pins are displaceable between a release position and a locking position; and
wherein, when in the locking position, a free end of the locking pins protrudes over the support plane and, in the release position, the free end of the locking pin is arranged in the support plane or at the side of the support plane, facing away from the rotation axis.

16. The freight carrier according to claim 15, wherein each of the retainers is displaceable along the vertical axis relative to the base element, between the retracted and the deployed positions.

17. The freight carrier according to claim 15, wherein a position of the locking pins on the base element is adjustable parallel with the support plane.

* * * * *